(12) United States Patent
Tamaoka et al.

(10) Patent No.: US 7,474,502 B2
(45) Date of Patent: Jan. 6, 2009

(54) ROTOR HUB, MOTOR, AND RECORDING DISK DRIVING DEVICE

(75) Inventors: Takehito Tamaoka, Kyoto (JP); Shingo Suginobu, Kyoto (JP)

(73) Assignee: Nidec Corporation, Kyoto (JP)

( * ) Notice: Subject to any disclaimer, the term of this patent is extended or adjusted under 35 U.S.C. 154(b) by 387 days.

(21) Appl. No.: 11/456,918

(22) Filed: Jul. 12, 2006

(65) Prior Publication Data

US 2007/0183090 A1    Aug. 9, 2007

(30) Foreign Application Priority Data

Feb. 7, 2006    (JP)    ............................. 2006-029263

(51) Int. Cl.
    *G11B 17/02*    (2006.01)
(52) U.S. Cl. .................................. 360/99.08
(58) Field of Classification Search ............. 360/99.08, 360/98.07, 99.12; 310/261, 216, 254
    See application file for complete search history.

(56) References Cited

U.S. PATENT DOCUMENTS

| | | | |
|---|---|---|---|
| 5,193,084 A * | 3/1993 | Christiaens ................. | 720/696 |
| 5,369,537 A | 11/1994 | Kinoshita et al. | |
| 5,479,304 A * | 12/1995 | Morita .................... | 360/98.07 |
| 5,877,918 A * | 3/1999 | Katakura et al. ......... | 360/99.08 |
| 6,761,485 B2 * | 7/2004 | Muraki et al. ............... | 384/504 |
| 6,961,215 B2 | 11/2005 | Hashizume et al. | |
| 2006/0158778 A1 * | 7/2006 | Engesser et al. ......... | 360/99.08 |
| 2006/0256469 A1 * | 11/2006 | Nishiyama et al. ....... | 360/99.08 |
| 2007/0058292 A1 | 3/2007 | Choi et al. | |
| 2007/0188033 A1 * | 8/2007 | Hada .......................... | 310/90 |

FOREIGN PATENT DOCUMENTS

| | | |
|---|---|---|
| JP | 2562727 Y2 | 10/1997 |
| JP | 2007-115380 A | 5/2007 |

* cited by examiner

*Primary Examiner*—Allen T Cao
(74) *Attorney, Agent, or Firm*—Keating & Bennett, LLP

(57) ABSTRACT

A rotor hub for use in a motor installed into a recording disk driving device to spin a recording disk includes a convex portion, a disk placing portion around the convex portion, and the relief portion which is a substantially circular concave portion disposed between the convex portion and the disk placing portion. The recording disk, preferably a 1.8-inch or smaller type disk, having a center circular through-hole, is mounted on the rotor hub. When the recording disk is mounted on the rotor hub, with the bottom surface thereof abutting against a portion of the disk placing portion and an inner side surface of the center circular through-hole of the recording disk, an upper edge of the relief portion is arranged axially lower than an upper edge of the inner side surface of the center circular through-hole, and a bottom edge of the relief portion is arranged inward from an inner edge of the bottom surface of the recording disk.

14 Claims, 6 Drawing Sheets

ROTOR HUB, MOTOR, AND RECORDING DISK DRIVING DEVICE

BACKGROUND OF THE INVENTION

1. Field of the Invention

The present invention relates to a rotor hub to which a recording disk is fixed, a motor which includes the rotor hub, and a recording disk driving device which includes the motor.

2. Description of the Related Art

A recording disk drive, such as a hard disk drive (HDD), is conventionally furnished with a spindle motor for rotationally driving a recording disk. Such spindle motors will be referred to simply as "motors" hereinafter. The recording disk is attached to a rotor hub of the motor. The recording disk includes a center opening, and the rotor hub includes a convex portion. The recording disk is attached to the rotor hub such that a periphery of the center opening of the recording disk is engaged with the convex portion, and is pressed to the rotor hub by, for example, a clamper or a fixing screw. As a result, the recording disk is fixed to the rotor hub with a bottom surface thereof abutted against a disk placing surface of the rotor hub.

Recently, the HDD has been installed in a mobile music player, and the demand for an HDD having a small dimension and a large storage capacity is increasing. In order to enlarge the storage capacity of the recording disk without enlarging the dimension of the recording disk, it is preferable to utilize a storage area of a bottom surface of the recording disk more effectively.

However, enlarging the effective storage area of the bottom surface of the recording disk results in reducing an abutting area between the recording disk and the rotor hub. Therefore, it is difficult to securely hold the recording disk on the rotor hub. For example, the recording disk may be bent by pressure applied by, for example, the damper if the abutting area between the recording disk and the rotor hub is reduced. As a result, an outer circumferential portion of the disk may be curved or a portion of the recording disk may be shifted relative to the rotor hub. Such a recording disk which is curved or bent may cause a reading/writing error of data.

An inner circumferential side of the disk placing surface provided on the rotor hub generally includes a relief portion (so-called undercut portion), generally as a downwardly extending convex portion, formed when a cutting tool changes its orientation during the cutting of the rotor hub. Therefore, the abutting area between the recording disk and the disk placing surface is further reduced, and it becomes more difficult to securely hold the recording disk on the rotor hub. Particularly, the impact which the relief portion imposes on the interface between the recording disk and the rotor hub is significant when the recording disk has a small dimension, such as a 1.8-inch type disk.

The relief portion may be diminished by using an extremely sharp cutting tool whose edge has an extremely small radius of curvature. However, such a cutting tool is not very durable, such that the appropriate productivity of the rotor hub cannot be maintained. In addition, the cost of manufacturing the rotor hub increases because commercial cutting tools do not have sufficient sharpness for this purpose.

SUMMARY OF THE INVENTION

In order to overcome the problems described above, preferred embodiments of the present invention provide a rotor hub which has a relief portion, on which a recording disk having a circular through-hole is disposed.

According to a preferred embodiment of the present invention, a rotor hub, preferably used for a motor installed in a recording disk driving device to spin a recording disk, includes a convex portion, a disk placing portion arranged around the convex portion and having a disk placing surface on which a recording disk is placed, and a relief portion which is a substantially circular concave portion disposed along the convex portion between the disk placing surface and an outer side surface of the convex portion.

The relief portion includes a bottom edge arranged at a location which is on a disk placing surface, a portion of the disk placing portion, and is disposed inward from an inner edge of the bottom surface of the center opening of the recording disk, placed on the rotor hub.

According to another preferred embodiment of the present invention, the rotor hub includes an upper edge of the relief portion provided between the relief portion and the outer side surface of the convex portion, opposing the inner side surface of the recording disk. The upper edge of the relief portion is arranged lower than an upper edge of the inner side surface along the center circular through-hole of the recording disk.

With the rotor hub according to preferred embodiments of the present invention, a bottom surface of the recording disk may be effectively allocated to the storage area while the recording disk is securely retained on the rotor hub, whereby it is possible to expand the storage capacity of the recording disk without expanding the outer diameter thereof. Therefore, the HDD having a small dimension and a large storage capacity is provided.

In the description of the preferred embodiments of the present invention herein, words such as upper lower, left, right, upward, downward, top, and bottom for explaining positional relationships between respective members and directions merely indicate positional relationships and directions in the drawings. Such words do not indicate positional relationships and directions of the members mounted in an actual device.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
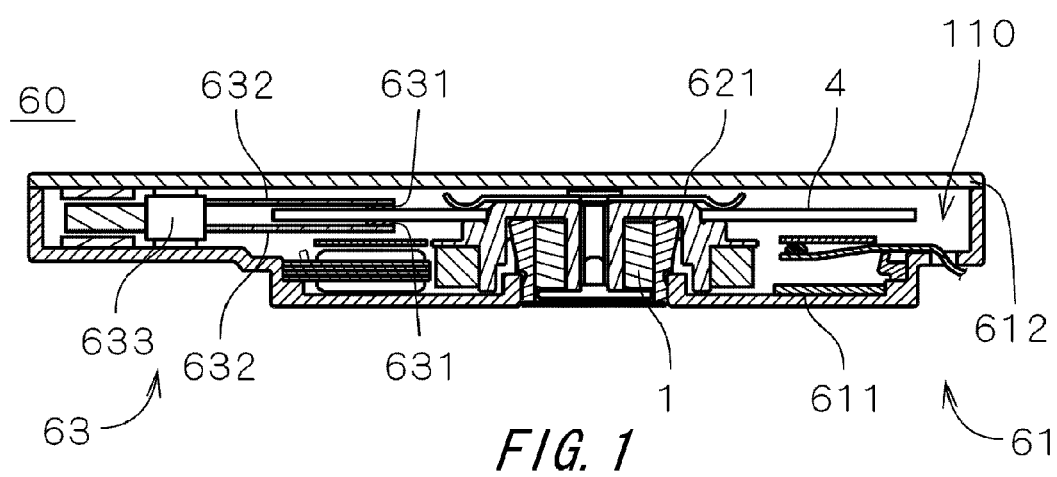
FIG. 1 is a diagram illustrating an internal configuration of a recording disk drive device according to a first preferred embodiment of the present invention.

FIG. 1 is a diagram illustrating the internal configuration of a recording disk drive device 60 including an electrically powered spindle motor 1 (simply "motor 1" hereinafter) according to a first preferred embodiment of the present invention. The recording disk drive device 60 is a hard disk drive (HDD), and includes a discoid recording disk 4 that records information, an access unit 63 that writes information onto and/or reads information from the recording disk 4, the electric motor 1 which retains and spins the recording disk 4, and a housing 61 with an interior space 110 that accommodates the recording disk 4, the access unit 63, and the motor 1.

As illustrated in FIG. 1, the housing 61 includes an opening in the upper portion thereof, a bottomed, first box housing component 611 on the undersurface of an inner side in which the motor 1 and the access unit 63 are attached, and a plate-like second housing component 612 that covers the opening in the first housing component 611 to define the interior space 110. In the recording disk drive device 60, the housing 61 is formed by joining the second housing component 612 to the first housing component 611, wherein the interior space 110 is a clean chamber in which dust and debris are greatly reduced.

The recording disk 4 is disposed on an upper end of the motor 1 and fixed to the motor by a clamp 621. According to this preferred embodiment of the present invention, the recording disk 4 is preferably a 1.8-inch type disk, and a thickness of the recording disk is about 0.4 mm (more particularly, about 0.37 mm in this preferred embodiment of the present invention). The access unit 63 includes a head 631 that is adjacent to the recording disk 4 for magnetically writing information onto and reading information from the recording disk 4, arms 632 that support the heads 631, and a head-shifting mechanism 633 that, by shifting the arms 632, varies the position of the heads 631 relative to the recording disk 4. With the configuration of these components, the heads 631 are moved into the required locations adjacent to the spinning recording disk 4, to conduct the reading and writing of information on the recording disk 4.

Figure 2:
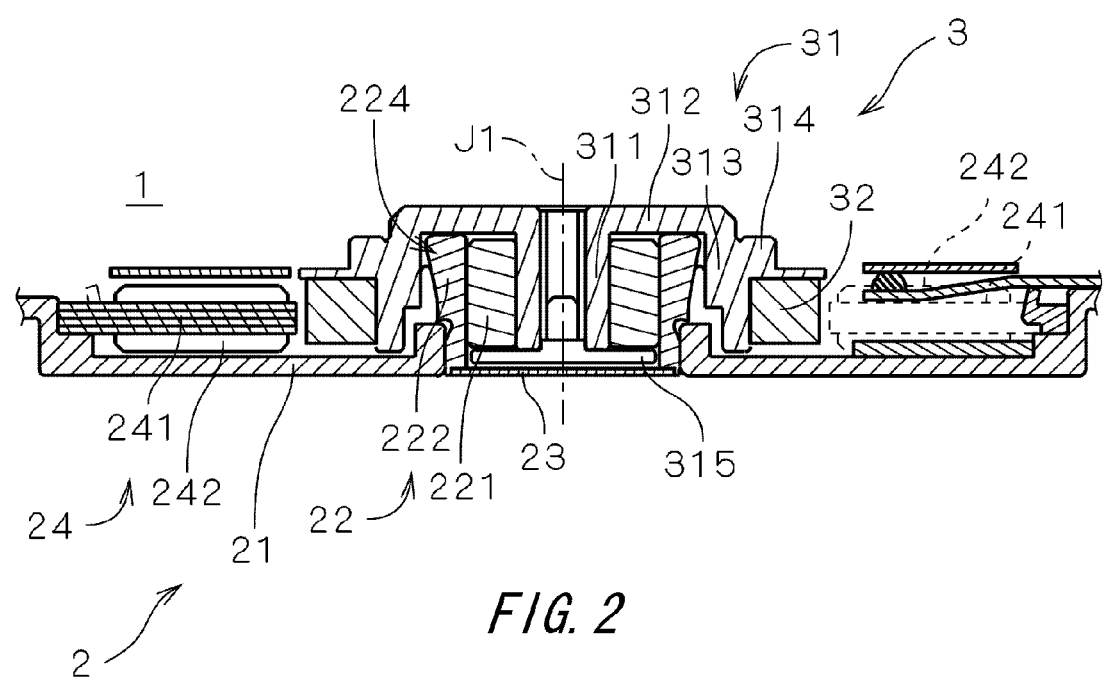
FIG. 2 is a vertical sectional view illustrating the configuration of the motor according to the first preferred embodiment of the present invention.

FIG. 2 is a vertical sectional view illustrating the configuration of the motor 1 to rotatably drive the recording disk 4 (see FIG. 1). As shown in FIG. 2, the motor 1 is an inner rotor type motor, and includes a stator portion 2 as a fixed assembly and a rotor portion 3 as a rotatable assembly. The rotor portion 3 is supported via a bearing mechanism utilizing hydrodynamic pressure of a lubricant oil, such that the rotor portion 3 is rotatable relative to the stator portion 2 around a center axis J1 of the motor 1. For convenience in the following explanation, the rotor portion 3 side of the motor 1 will be described as the upper end and the stator 2 side as the bottom end. However, the center axis J1 need not necessarily coincide with the direction of gravity, i.e., the center axis J1 may be oriented in a direction other than vertical.

The stator portion 2 includes a baseplate 21, as a base portion of the motor 1, that retains the different components of the stator portion 2, a cylindrical sleeve unit 22 that defines a portion of the bearing mechanism that rotatably supports the rotor portion 3, and a stator 24 that is attached to the baseplate 21 around the sleeve unit 22. The bottom portion of the sleeve 22 is press-fitted into an opening of the baseplate 21, and the opening along the lower end of the sleeve unit 22 is closed by a discoid sealing cap 23.

The sleeve unit 22 includes a substantially cylindrical sleeve 221 into which a shaft 311 of the rotor portion is inserted and centered on the center axis J1, and a substantially cylindrical sleeve housing 222 attached to an outer periphery of the sleeve 221. The sleeve 221 is preferably made of porous material, and the sleeve housing 222 holds lubricant oil with which the sleeve 221 is impregnated. The stator 24 includes a core 241 made by laminating a plurality of silicon steel plates, and a plurality of coils 242 wound around a plurality of teeth provided on the core 241.

The rotor portion 3 includes a rotor hub 31 that retains the different parts of the rotor portion 3, and a field magnet 32, disposed to encircle the center axis J1, attached to the rotor hub 31. The field magnet 32 is a preferably circular multipolar magnet and generates rotational force (torque) centered on the center axis J1 between itself and the stator 24.

The rotor hub 31 is preferably formed unitarily from stainless steel or other suitable metal and includes the cylindrical shaft 311 that extends downward (i.e., toward the stator portion 2), and centered on the center axis J1; a discoid convex portion 312, which extends substantially perpendicularly with respect to the center axis J1, from the upper end portion of the shaft 311; a substantially cylindrical portion 313 that extends downward along the rim of the convex portion 312; and a disk placing portion 314 on which the recording disk 4 is placed and that extends outward from the outer surface of the cylindrical portion 313. A substantially discoid thrust plate 315 is attached to a bottom tip-end portion of the shaft 311.

Figure 3:
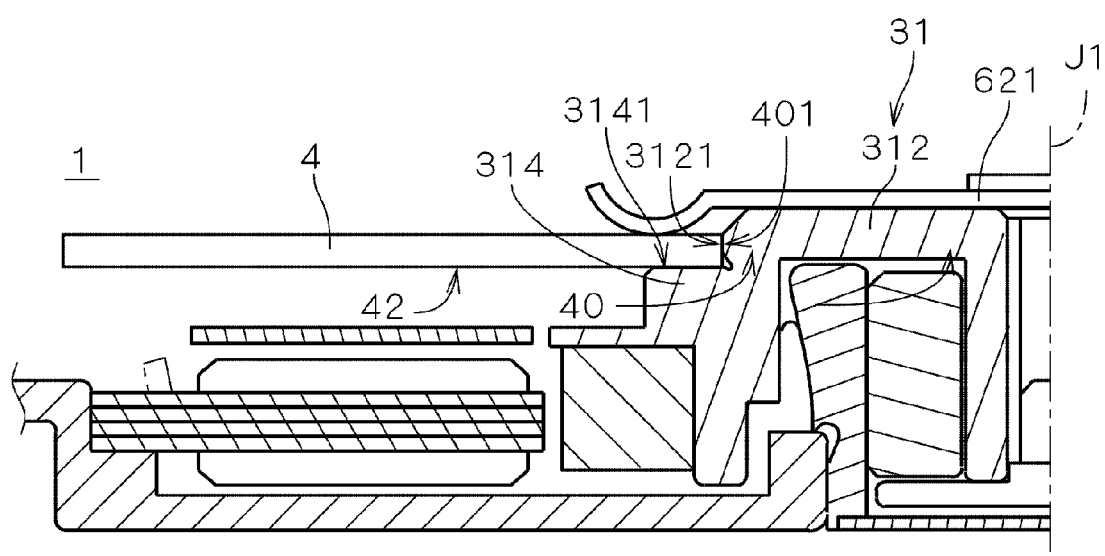
FIG. 3 is a magnified view illustrating a portion of the motor shown in FIG. 2.

FIG. 3 is a vertical section illustrating a portion of the motor 1 (the left half in FIG. 2) in a magnified view. In FIG. 3, the recording disk 4 and the damper 621 are also illustrated. As shown in FIG. 3, the recording disk 4 has a circular opening 40, centered on the center axis J1, into which the convex portion 312 of the rotor hub 31 is inserted, such that the recording disk 4 is engaged with the convex portion 312. An outer surface 3121 of the convex portion 312 opposes an inner side surface 401 of the opening 40 provided on the recording disk 4, and hereinafter, the outer surface 3121 is referred to as a disk engaging surface 3121. A bottom surface 42 of the recording disk 4 is abutted against a substantially circular upper surface 3141 of the disk placing portion 314 (hereinafter referred to as a disk placing surface 3141), extending perpendicularly with respect to the center axis J1, around the convex portion 312. A tapped hole, centered on the center axis J1, is provided on the convex portion 312 of the rotor hub 31, and the recording disk 4 is attached to the rotor hub 31 with the damper 621, fixed to the hub by a screw screwed into the tapped hole.

Next, a bearing mechanism utilizing hydrodynamic pressure to rotatably support the rotor portion 3 relative to the stator portion 2 in the motor 1 will be explained. As illustrated in FIG. 2, micro-gaps are provided in the motor 1 between a bottom surface of the convex portion 312 of the rotor hub 31 and an upper end surface of the sleeve housing 222; between the inner-side surface of the sleeve 221 and the outer-side surface of the shaft 311; between an bottom end surface of the sleeve 221 and an upper surface of the thrust plate 315; between a bottom surface of the thrust plate 315 and an upper surface of the sealing cap 23; and between an outer-side surface of a flange portion 224, an upper portion of the sleeve housing 222, and an inner-side surface of the cylindrical section 313 of the rotor hub 31. The lubricating oil continuously fills the micro-gaps between the rotor hub 31, sleeve unit 22, and the seal chap 23 without interruption, whereby the full-filled bearing mechanism is provided.

An inclined surface is provided on the outer-side surface of the flange portion 224 of the sleeve housing 222, where the outer diameter of the housing gradually decreased heading downward, while the cylindrical section 313 of the rotor hub 31 is configured so that its inner-side surface, which opposes the outer-side surface of the flange portion 224, has a constant diameter. With this configuration, the boundary surface of the lubricating oil in the gap between the flange portion 224 and the cylindrical portion 313 forms a meniscus due to capillary action and surface tension, defining a taper seal, whereby the gap functions as an oil buffer, preventing outflow of the lubricating oil.

On the upper end surface of the sleeve housing 222 and on the bottom end surface of the sleeve 221, grooves (for example, grooves in spiral form) for directing the lubricating oil pressure toward the center axis J1 when the rotor portion 3 spins are provided, wherein thrust dynamic-pressure bearing sections are defined by the end surfaces mentioned above and opposing surfaces thereto.

In addition, grooves (for example, herringbone grooves provided on the top and bottom, with respect to the orientation of the center axis J1, of the inner-side surface of the sleeve 221) for producing hydrodynamic pressure in the lubricating oil are provided on the surface(s) of the shaft 311 and/or the sleeve 221 opposing each other, wherein a radial dynamic-pressure bearing section is defined by the surfaces opposing each other.

In the motor 1, the fact that the rotor portion 3 is supported in a non-contact manner, via the lubricating oil, by the hydrodynamic-pressure-using bearing mechanism enables the recording disk 4 (see FIG. 1), attached to the rotor portion 3, to spin with high precision and low noise. In addition, the bottom surface of the convex portion 312 of the rotor hub 31 defines a portion of the bearing mechanism, whereby the vertical dimension of the motor 1 is reduced.

Figure 4:
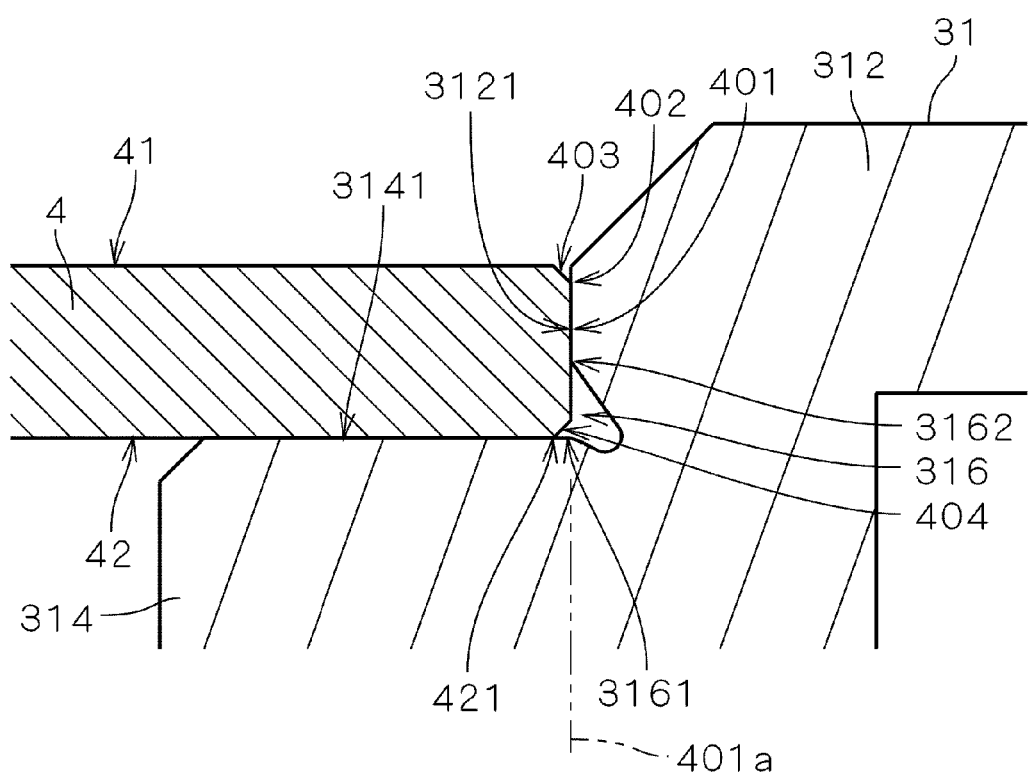
FIG. 4 is an enlarged vertical section view illustrating a portion of the recording disk and the rotor hub.

FIG. 4 is an enlarged vertical section view illustrating a portion of the recording disk 4 and the rotor hub 31. The upper surface 41 of the recording disk 4 is chamfered at an upper peripheral portion of the circular opening 40, whereby an upper inclined surface 403, inclining with respect to the center axis J1, is provided between the upper surface 41 and the inner side surface 401. Likewise, the bottom surface 42 of the recording disk 4 is chamfered at the bottom peripheral portion of its bottom surface 42, whereby a bottom inclined surface 404, inclining with respect to the center axis J1, is provided between the bottom surface 42 and the inner side surface 401.

The rotor hub 31 is formed by cutting the stainless steel material, retained on a computer-numerical-control (CNC) turning latch, with the cutting tool. During the processing of the convex portion 312 and the disk placing portion 314, the stainless steel is cut from the outer side toward the inner side (toward the center axis J1) of the disk placing portion 314 to form the disk placing surface 3141, and subsequently, is cut in a direction away from the disk placing surface 3141 to form the disk engaging surface 3121 of the convex portion 312. In this preferred embodiment of the present invention, a width in the radial direction of the disk placing surface 3141, centering on the center axis J1, is about 0.45 mm.

During the processing of the rotor hub 31, a relief portion 316 (a substantially circular concave portion) is provided between the disk engaging surface 3121 of the convex portion 312 and the disk placing surface 3141 of the disk placing portion 314 to stably change a moving direction of the cutting tool and to prevent rotor hub 31 from contacting the recording disk 4 around the bottom inclined surface 404. In this preferred embodiment of the present invention, the relief portion 316 is formed so as to have concave shape extending in an inwardly obliquely downward direction from the inner side of the disk placing surface 3141 (i.e., toward the center axis J1 and axially bottom direction).

As shown in FIG. 4, an edge 3161 of the relief portion 316, near the disk placing surface 3141, is disposed inward from an inward side edge on the bottom surface 42 of the recording disk 4. The edge 3161 of relief portion 316 is an inward side edge of the disk placing surface 3141 as well, and hereinafter referred to as a first relief portion edge. The inward side edge on the bottom surface 42 of the recording disk 4 is the bottom edge on the bottom inclined surface 404 of the recording disk 4. With the configuration, the disk placing surface 3141 of the rotor hub abuts against a circular area of the recording disk 4 including the inward side edge on the bottom surface 42 (i.e., an inside circular area of the recording disk 4), whereby even if the outer diameter of the disk placing surface is reduced to increase the storage area on the bottom surface 42 of the recording disk 4, the dimension of the abutting area between the recording disk 4 and the disk placing surface 3141 is kept large. As a result, it is possible to prevent the recording disk 4 from being bent by the force damper 631 (see FIG. 3) applies thereto.

Meanwhile, an edge 3162 of the relief portion 316, near the disk engaging surface 3121, is disposed at an axially lower position, in the center axis J1 direction, than an upper edge on the inner side surface 401 of the recording disk 4 (i.e., a bottom edge on the upper inclined surface 403 of the recording disk). The edge 3162 of relief portion 316 is a bottom edge of the disk engaging surface 3121 as well, and hereinafter referred to as a second relief portion edge. With this configuration, the inner side surface 401 of the recording disk 4 securely opposes the disk engaging surface 3121 of the rotor hub 31, whereby the movement of the recording disk 4, perpendicular to the center axis J1, is prevented.

As explained above, in the motor 1 according to the present preferred embodiment of the present invention, the large area on the bottom surface of the recording disk 4 is reserved for the storage area while the recording disk 4 is securely retained without being bent and displaced. Therefore, the present preferred embodiment of the present invention is preferably applied to the recording disk 4 which is a 1.8-inch type or smaller types, because the abutting areas of the disk placing surface 3141 are inevitably small.

The first relief portion edge 3161 is provided on the rotor hub 31 and is the intersection between the axially downwardly extended surface of the disk engaging surface 3121 (a virtual plane 401a illustrated by two-dot chain line in the FIG. 4) along the center axis J1 (i.e., extended toward the disk placing surface 3141) and the disk placing surface 3141. With this configuration, the first relief portion edge 3161 may be arranged at substantially the same position as or at an inner position from the inner side edge 421, even if the bottom inclined surface 404 is not provided on the inner circumferential side of the recording disk 4 (i.e., the bottom portion of the inner side surface 401 is not chamfered, and the inner side surface 401 substantially perpendicularly intersect with the bottom surface 42). As explained above, according to the preferred embodiment of the present invention, regardless of the shape of the inner side portion of the recording disk 4, the abutting area of the recording disk 4 against the disk placing surface 3141 is enlarged, and the recording disk 4 is securely retained.

On the rotor hub 31, the second relief portion edge 3162 is arranged at the axially lower position than the axial middle portion of the inner side surface 401 of the recording disk 4. As explained above, according to the present preferred embodiment of the present invention, the abutting area of the recording disk 4, abutting against the disk engaging surface 3121, is enlarged, and the displacement of the recording disk 4 with respect to the center axis J1 is prevented. As a result, the recording disk 4 is securely retained.

Figure 5:
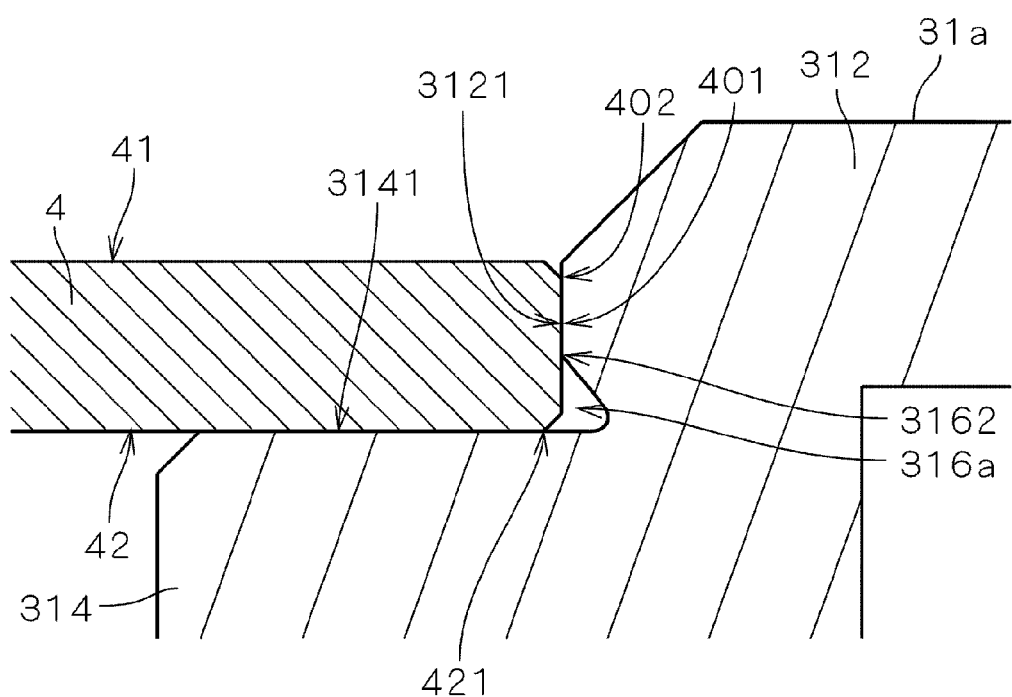
FIG. 5 is an enlarged vertical section view illustrating a portion of the recording disk and the rotor hub according to a second preferred embodiment of the present invention.

Next, a motor according to the second preferred embodiment of the present invention will be described. FIG. 5 is an enlarged vertical sectional view illustrating a portion of the recording disk and the rotor hub according to a second preferred embodiment of the present invention. The relief portion 316a, having a different shape than the relief portion 316, is provided between the disk engaging surface 3121 of the convex portion 312 and the disk placing surface 3141 of the disk placing portion 314 of the rotor hub 31a. The remainder of the configuration is the same as that of FIG. 4, and is labeled with the same reference numerals in the explanation that follows.

As shown in FIG. 5, in the rotor hub 31a, the inwardly extended surface of the disk placing surface 3141 corresponds to the bottom surface of the relief portion 316a. Similar to the first preferred embodiment, the disk placing surface 3141 abuts against the (inner) circular portion including the inner side edge 421 of the bottom surface 42 of the recording disk 4. In addition, similar to the first preferred embodiment of the present invention, the second relief portion edge 3162, the edge of the bottom side of the disk engaging surface 3121, is arranged at the position axially lower than the axial middle portion of the inner side surface 401 of the recording disk 4. Therefore, the second relief portion edge 3162 is arranged lower than the upper side edge 402 of the inner side surface 401 of the recording disk 4. As explained above, the abutting area of the recording disk 4 against the disk placing surface 3141 is enlarged, and the inner side surface 401 of the recording disk 4 opposes to the disk engaging surface 3121. As a result, the recording disk 4 is securely retained while preventing the recording disk from being bent and displaced.

In the rotor hub 31a, the relief portion 316a is provided at a portion above the disk placing surface 3141. In other words, the relief portion 316a is provided above the inwardly extended surface of the disk placing surface 3141. With this configuration, the disk placing surface 3141 extends in a radially inward direction, centered on the center axis J1, until it intersects with the downwardly extended surface of the disk engaging surface 3121 along the center axis J1. Therefore, even if the bottom portion of the inner side surface 401 of the recording disk 4 is not chamfered, the abutting area of the recording disk 4, abutted against the disk placing surface 3141, is enlarged. As a result, regardless of the shape of the inward disk portion, the recording disk 4 is securely retained.

In addition, the relief portion 316a is provided above the disk placing surface 3141. Therefore, after cutting the disk placing portion 314 from the outer side toward the inner side thereof to define the disk placing surface 3141 during processing of the convex portion 312 and disk placing surface 3141, the relief portion 316a is easily provided at the bottom end portion of the convex portion 312 by further moving the cutting tool toward the center axis J1 side (see FIG. 3) along the disk placing surface 3141 during the processing of the disk placing portion 314. As a result, the manufacture of the rotor hub 31 is simplified.

Figure 6:
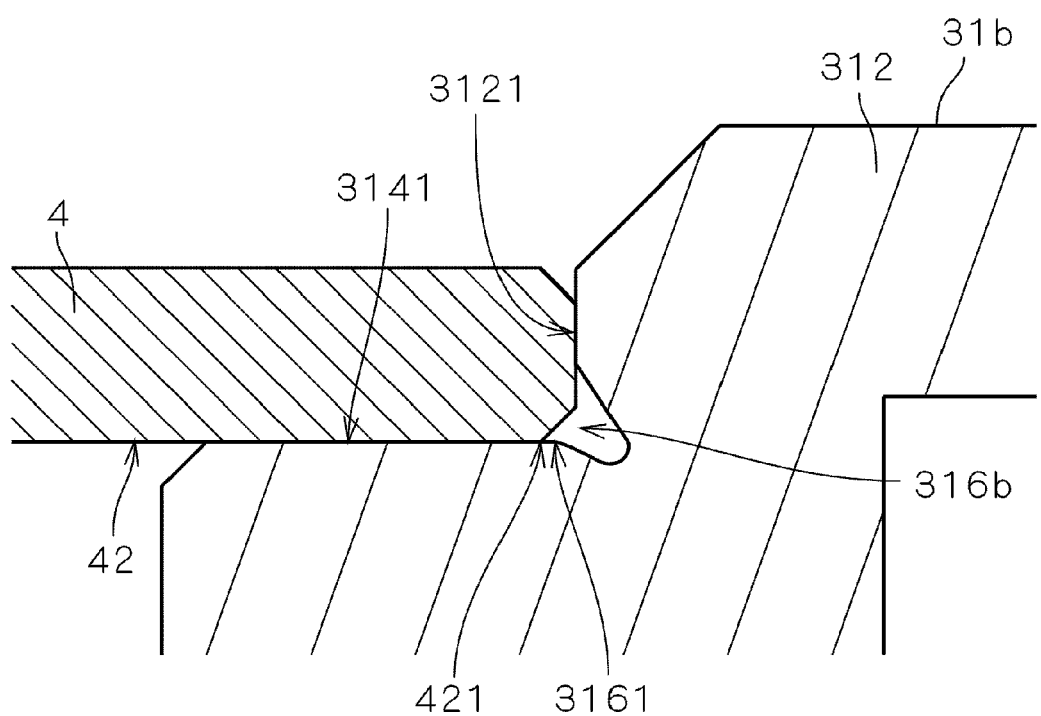
FIG. 6 is a view illustrating a rotor hub according to another preferred embodiment of the present invention.

A vertical section of the rotor hub according to another preferred embodiment of the present invention will now be described with reference to FIG. 6. In the rotor hub 31b shown in FIG. 6, the first relief portion edge 3161 of a relief portion 316b, the inner circumferential edge of the disk placing side 3141, is arranged at a position radially inward from the inner side edge 421 on the bottom surface 42 of the recording disk 4 and radially outward from the disk engaging surface 3121. Similar to the first and second preferred embodiments of the present invention, the recording disk 4 is securely retained while preventing the recording disk 4 from being bent and displaced.

The disk placing surface 3141 of the rotor hub does not have to be perpendicular to the center axis J1. For example, the disk placing surface 3141 may be downwardly inclined from the outer side to the inner side.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A rotor hub for use in a motor installed in a recording disk driving device to spin a recording disk, to which the recording disk including an inner side surface along a center circular through-hole is arranged, the rotor hub comprising:
   a convex portion engaging the center circular through-hole of the recording disk;
   a disk engaging surface defined by an outer side surface of the convex portion, a portion thereof engaging the inner surface of the circular center opening of the recording disk;
   a disk placing portion, arranged around the convex portion, on which the recording disk is placed;
   a disk placing surface defined by a portion of an upper surface of the disk placing portion, at least a portion of the disk placing surface abutting against a bottom surface of the recording disk;
   a relief portion defined by a substantially circular concave portion extending inwardly from the disk engaging surface, and arranged between the disk placing surface and the disk engaging surface along the convex portion; and
   an upper edge of the relief portion provided between the relief portion and the disk engaging surface, and opposing the inner side surface of the recording disk; wherein
   the upper edge of the relief portion is arranged lower than an upper edge of the inner side surface along the center circular through-hole of the recording disk.

2. The rotor hub as set forth in claim 1, wherein the upper edge of the relief portion is arranged lower than a substantially middle position in an axial direction of the inner side surface of the recording disk.

3. The rotor hub as set forth in claim 1, further comprising a bottom edge of the relief portion, wherein the bottom edge is disposed at a boundary between the disk placing surface and the relief portion, the boundary is located inward from the bottom inner edge of the recording disk.

4. The rotor hub as set forth in claim 3, wherein the bottom edge of the relief portion is arranged along a line of an intersection of the disk placing surface and an extending surface to define a virtual surface defined as an extension of the disk engaging surface toward the disk placing surface.

5. The rotor hub as set forth in claim 1, wherein the relief portion is located above a virtual plane defined as an extension of the disk placing surface disposed radially inwardly of the recording disk.

6. An electrically powered motor used for a recording disk driving device to spin the recording disk, comprising:
   a rotor portion including the rotor hub as set forth in claim 1 and a field magnet arranged around a center axis of the motor;
   a stator portion including a stator which generates a rotation force centered on the center axis between itself and the field magnet, and a base portion to which the stator is mounted; and
   a bearing mechanism which rotatably supports the rotor portion relative to the stator portion.

7. A recording disk driving device comprising:
   a recording disk on which information is stored;
   the motor as set forth in claim 6 which spins the recording disk;

a head which reads/writes information from/on the recording disk; and a head-positioning mechanism which moves the head relative to the recording disk and the motor.

8. The recording disk driving device as set forth in claim 7, wherein the recording disk which is mounted on the rotor hub is a 1.8-inch or smaller type disk.

9. A rotor hub for use in a motor installed in a recording disk driving device to spin a recording disk, to which the recording disk including an inner side surface along a center circular through-hole is mounted, comprising:

a convex portion engaging the center circular through-hole of the recording disk;

a disk engaging surface defined by an outer side surface of the convex portion, a portion of which engaging an inner surface of the circular center opening of the recording disk;

a disk placing portion, arranged around the convex portion, on which the recording disk is placed;

a disk placing surface, a portion of the disk placing portion, abutting against a bottom surface of the recording disk;

a relief portion defined by a substantially circular concave downwardly indented portion from the disk placing surface, arranged between the disk placing surface and the disk engaging surface along the convex portion; and a bottom edge of the relief portion provided between the relief portion and the disk placing surface, opposing the bottom surface of the recording disk; wherein the bottom edge of the relief portion is arranged inward from an inner edge of the bottom surface along the center circular through-hole of the recording disk.

10. The rotor hub as set forth in claim 9, wherein the bottom edge of the relief portion is arranged along a line of the intersection of the disk placing surface and an extending surface to define a virtual surface defined as an extension of the disk engaging surface toward the disk placing surface.

11. The rotor hub as set forth in claim 9, wherein the relief portion is located below the disk placing surface.

12. An electrically powered motor used for a recording disk driving device to spin the recording disk, comprising:

a rotor portion including the rotor hub as set forth in claim 9 and a field magnet arranged around a center axis of the motor;

a stator portion including a stator which generates a rotation force centered on the center axis between itself and the field magnet, and a base portion to which the stator is mounted; and a bearing mechanism which rotatably supports the rotor portion relative to the stator portion.

13. A recording disk driving device comprising:

a recording disk on which information is stored;

the motor as set forth in claim 12 which spins the recording disk;

a head which reads/writes information from/on the recording disk; and a head-shifting mechanism which moves the head relative to the recording disk and the motor.

14. The recording disk driving device as set forth in claim 13, wherein the recording disk which is attached to the rotor hub is a 1.8-inch or smaller type disk.

* * * * *